United States Patent
Quaeck

(10) Patent No.: US 6,814,637 B1
(45) Date of Patent: Nov. 9, 2004

(54) MARINE, INBOARD, THROUGH-HULL PROPELLER DRIVE

(76) Inventor: Manfred W. Quaeck, 1515-210th Ave. NE., Sammamish, WA (US) 98074

( * ) Notice: Subject to any disclaimer, the term of this patent is extended or adjusted under 35 U.S.C. 154(b) by 0 days.

(21) Appl. No.: 10/762,753

(22) Filed: Jan. 23, 2004

(51) Int. Cl.⁷ .............................. B63H 23/36
(52) U.S. Cl. ........................ 440/112; 440/75
(58) Field of Search .................. 440/112, 75

(56) References Cited

U.S. PATENT DOCUMENTS

| | | | |
|---|---|---|---|
| 2,809,605 A | * 10/1957 | Russell | 440/61 R |
| 3,403,655 A | * 10/1968 | Warburton | 440/57 |
| 3,598,194 A | * 8/1971 | Wappler et al. | 180/6.2 |
| 3,951,096 A | * 4/1976 | Dunlap | 440/57 |
| 4,610,645 A | * 9/1986 | Donn et al. | 474/112 |

* cited by examiner

Primary Examiner—Jesus D. Sotelo

(57) ABSTRACT

The propeller drive is installed with its drive shaft inside a boat hull and it's driven (propeller) shaft outside. The shafts are interconnected by a silent chain. The drive shaft position is adjustable to adjust the distance between it and the driven shaft, thus adjusting tension in the chain. The drive shaft is carried in two bearings which are installed eccentrically in two bearing carriers. The bearing carriers are rotatably mounted in a casing and are structurally interconnected by a connector. The adjustments are made by rotational adjustment of the connector relative to the casing.

7 Claims, 6 Drawing Sheets

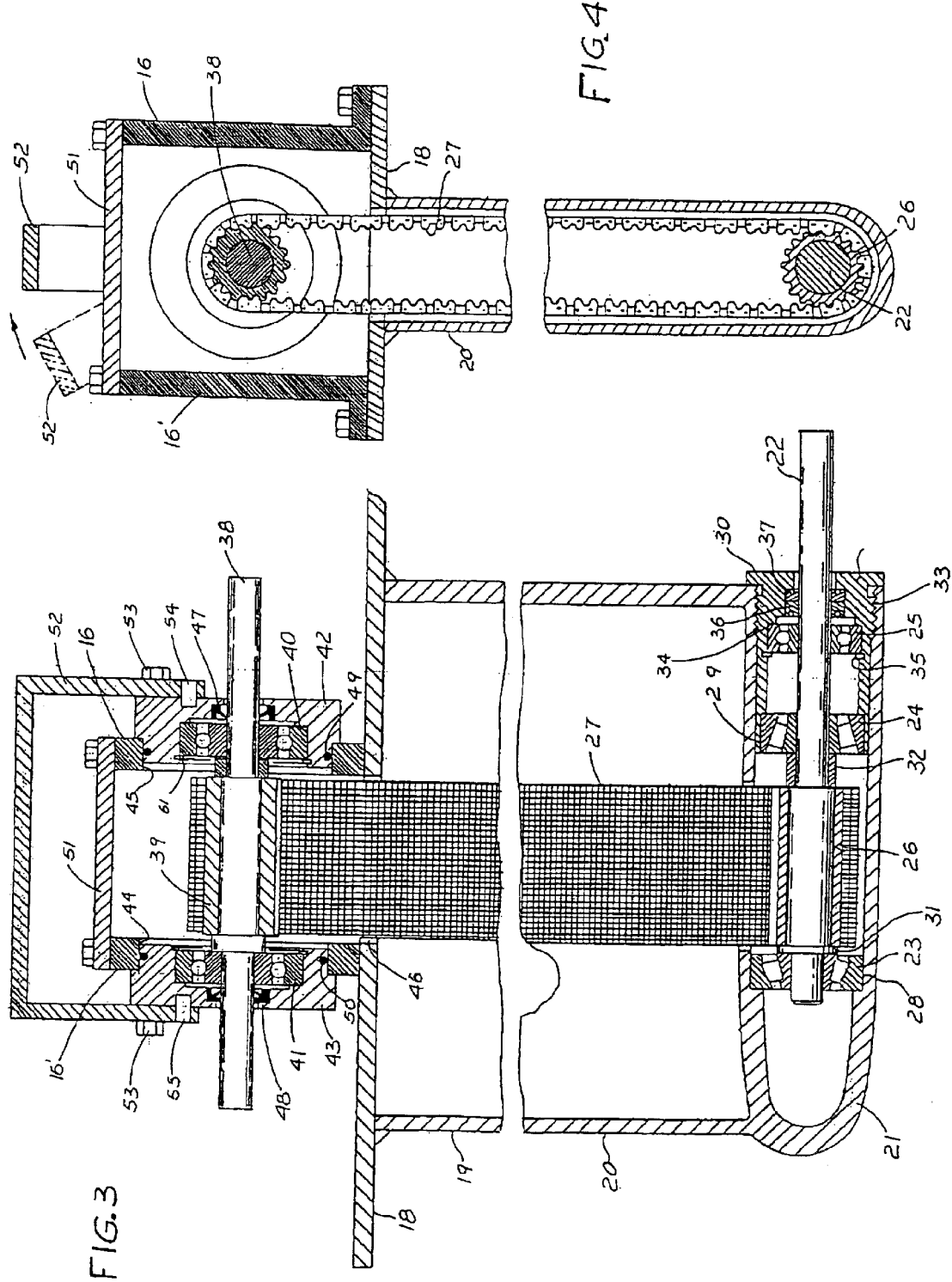

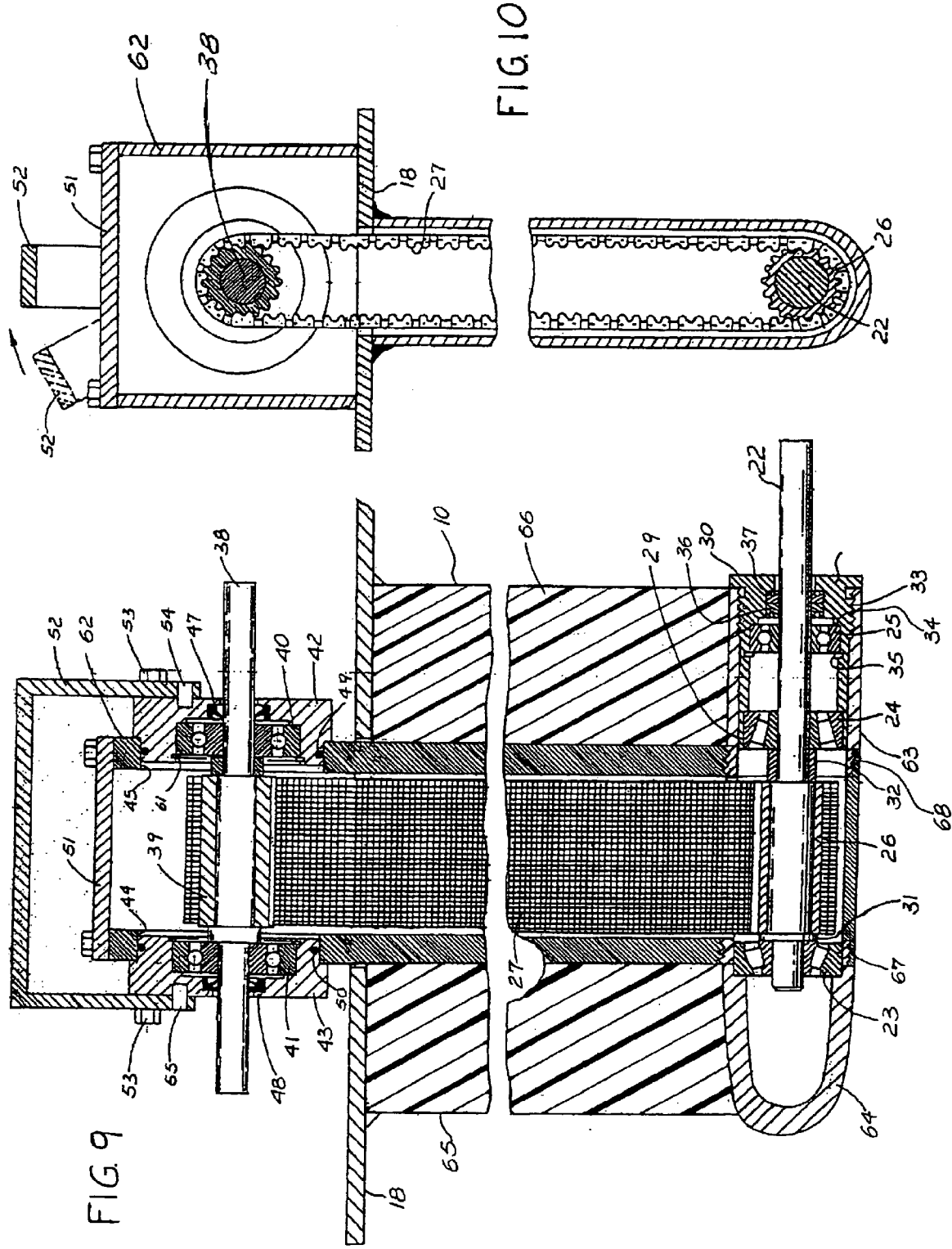

MARINE, INBOARD, THROUGH-HULL PROPELLER DRIVE

BACKGROUND OF THE INVENTION

1. Field

The subject invention is in the field of mechanical power transmission and transfer mechanisms, particularly the field of power transfer from an engine in a boat to the propeller driven by the engine. More particularly it is in the field of such drives in which the drive shaft and propeller shaft are parallel and essentially horizontal such as in well known inboard/outboard drives in which power is transmitted through the stem of a boat above the waterline and then down to the propeller shaft and propeller. However, the subject drive is an inboard drive which is mounted through the bottom of the boat to transmit the power. But a transom mounting is also possible. A feature common in inboard/outboard drives is that the drive shaft and propeller are parallel and power is transmitted between the two using bevel and/or miter gearing, chains or belts. One important objective of such drives is that the components in the water present as low frontal area as possible to minimize drag losses. This is particularly important for sailboats in which the propeller is an auxiliary power source and must present minimum drag when the boat is under sail. The problem is more severe for larger boats in which auxiliary power levels are in the range of 100 to 300+H.P. Since such boats are not high speed boats, propeller speeds must be relatively low and propellers fairly large to achieve satisfactory efficiency. These facts require that the torque capacity of the drive be high relative to the horsepower level. In the stated horsepower range high torque per horsepower gear drives become bulky and very complex. Chain drives are better suited to high torque per horsepower transmissions; however good operation, efficiency and long life of chain drives, particularly bi-directional drives, requires that the chains be under tension and correspondingly free of slack and running in a straight line from sprocket to sprocket. It is close to physically impossible and economically and practically impossible, using conventional techniques, to design and assemble a chain drive in which the chain is always in tension without using some sort of tensioning device. This is caused in large part by the fact that use invariably involves wearing in and wear will allow the chain(s) to go slack. Tensioning devices inherently tend to add undesirable amounts of frontal area and complication.

2. Prior Art

There is much prior art in the particular field described above and many of the prior art drives use chains. The U.S. patents listed here are typical examples:

1. U.S. Pat. No. 2,809,605
2. U.S. Pat. No. 3,403,655
3. U.S. Pat. No. 3,795,219
4. U.S. Pat. No. 3,951,096
5. U.S. Pat. No. 4,645,463
6. U.S. Pat. No. 4,869,692
7. U.S. Pat. No. 4,887,983
8. U.S. Pat. No. 4,925,413
9. U.S. Pat. No. 4,932,907
10. U.S. Pat. No. 4,992,066
11. U.S. Pat. No. 5,813,887
12. U.S. Pat. No. 5,961,358

As background to discussion of this prior art, it is important to state that the chains having the highest power capacity for their size and weight are chains known as silent chains. These chains comprise pluralities of flat links having a tooth form at each end. The side-by side links are pinned end to end so that the teeth forms form teeth when the chain is in contact with the sprockets on which it is mounted. Chain width is determined by the power required and the resulting number of links pinned side-by-side. Making and using these chains as mechanically efficiently as possible results in their having the characteristics that (1) they allow only limited bending in the direction away from the toothed side of the chain, and (2) the durability and efficiency depend on their being as straight as possible between sprockets at all times. These factors relate to the need for tension adjustment and prohibit techniques using tension idlers which would not allow the chain to be straight between sprockets.

Regarding the cited prior art, patents 2,5,6,7,8,9 and 10 utilize roller chains and show no specific means for adjusting tension except in patents 1 and 10. The adjustment in patent 1 is accomplished by adjusting the distance between the drive and driven shafts by having the shafts in separate assemblies which fit together telescopically. It is judged that making the housings telescopic is not an economically efficient technique and is mechanically cumbersome. Also to make such a design oil tight is very complex. The means shown in patent 10 comprises an oval shaped cam pivotally mounted midway between the lengths of chain between the sprockets. Rotating the cam in one direction so that the cam ends contact the chain will spread the chain apart and increase tension. This does not allow the chain in tension to be straight. Also, this means can only be used in unidirectional drives. With rotation in the wrong direction the cam would be forcefully rotated into the chain and jammed.

The remaining patents show drives using belts of some kind. Patent 2) uses a toothed belt and shows no means of adjusting tension even for the purpose of removing and installing the belt. Patent 3) also shows the use of a toothed belt with means for adjusting tension for the purpose of removing and installing the belt but none for compensating for belt stretch and other factors which are known to cause loosening of the toothed belts. The means used comprise a spherically mounted bearing on one end of the drive shaft so that when the housing is disassembled and the bearing at the other end of the shaft is removed, the shaft can drop to an angle sufficient to allow the teeth on the belt to clear the rim on the sprocket, thus facilitating removal and replacement. The end of the shaft freed by dismantling the casing is tapered to facilitate its reentry into the bearing when the case is assembled, leveling the drive shaft again and providing nominally acceptable belt tension. However, this adjustment feature does not allow compensation for belt stretch and other factors which are known to cause belt loosening. Also, to enable replacement of this belt the casing is divided vertically into forward and aft parts, generating a need for long parting surfaces and a plurality of fasteners are needed to assemble the casing.

Patent 4) shows the use of dual toothed belts. There are no provisions for tension adjustment and the method of assembly and disassembly of the belt drive is not disclosed.

Many motorcycles transmit driving power from a drive shaft to a driven shaft, the rear axle. Chain tension is adjusted by adjusting the position of the rear axle and everything carried by it relative to the drive shaft. This technique cannot be used in propeller drives because the driven shaft must be enclosed in a housing.

The closest prior art for the subject invention is disclosed in U.S. Pat. No. 6,413,127 "Low Frontal Area, Inboard Through-Hull Propeller Drive and Methods For Assembling and Adjusting the Driven" and U.S. Pat. No. 6,663,449 "Low Frontal Area, Inboard, Through-Hull Propeller Drive" and invented by the inventor of the subject invention.

In view of this prior art, the objective of the subject invention is to provide a low frontal area, inboard, through-hull propeller drive for power ranging up to 300+H.P., the drive using a silent chain and having (1) a housing having a minimum number of parts and short parting lines, (2) simple means for adjusting chain tension for installation and removal purposes and compensation for wear without any disassembly, (3) allowing simple chain installation and removal, and (4) using simple conventional sealing techniques.

SUMMARY OF THE INVENTION

The subject invention is a low frontal area, inboard, through-hull propeller drive. The drive comprises (1) a casing having a high fineness ratio streamlined cross section shape and an upper and a lower end, (2) a lower end apparatus comprising a propeller shaft, driven chain sprocket and bearings installed at the lower end of the casing through the opening for the propeller shaft and is bearings, (3) an upper end apparatus attached to the upper end of the casing, having a drive shaft, drive sprocket and bearings installed in it, and (4) a silent chain interconnecting the sprockets in the lower and upper apparatus.

The drive shaft and sprocket are carried in the upper apparatus on two bearings, each of which is carried eccentrically in a bearing carrier adjustably installed in a centric bore at an end of the drive casing. The bearing carriers are structurally interconnected and chain tension is adjusted by rotating the interconnected carriers in the centric bores of the upper apparatus. Sealing is provided by O-Rings installed on the bearing carriers which seal against the centric bore of the casing. In this design the forces imposed on the bearing carriers—chain loading—are directly carried by the housing and not dependent on clamping force of bolts.

The assembly procedure is to install the chain in the lower apparatus and connect the extending chain ends. The upper apparatus is then attached to the upper end and the drive shaft and sprocket are inserted into the casing using the openings at the upper ends of the casing. In a second embodiment the centric bores are in ends of the upper apparatus. Then the bearings and bearing carriers are installed and the bearing carriers are structurally interconnected to coordinate their adjustment movement relative to the casing. The chain tension is adjusted by rotating the interconnected bearing carriers which carry the shaft, sprocket and the bearings which are eccentrically mounted.

The invention is described in more detail below with reference to the attached drawings.

BRIEF DESCRIPTION OF THE DRAWINGS

FIG. 3 is a sectional view taken at 3—3 in FIG. 2.

FIG. 4 is a sectional view taken at 4—4 in FIG. 2.

FIG. 9 is a sectional view taken at 9—9 in FIG. 8.

FIG. 10 is a sectional view taken at 10—10 in FIG. 8.

DETAILED DESCRIPTION OF THE INVENTION

Figure 1:
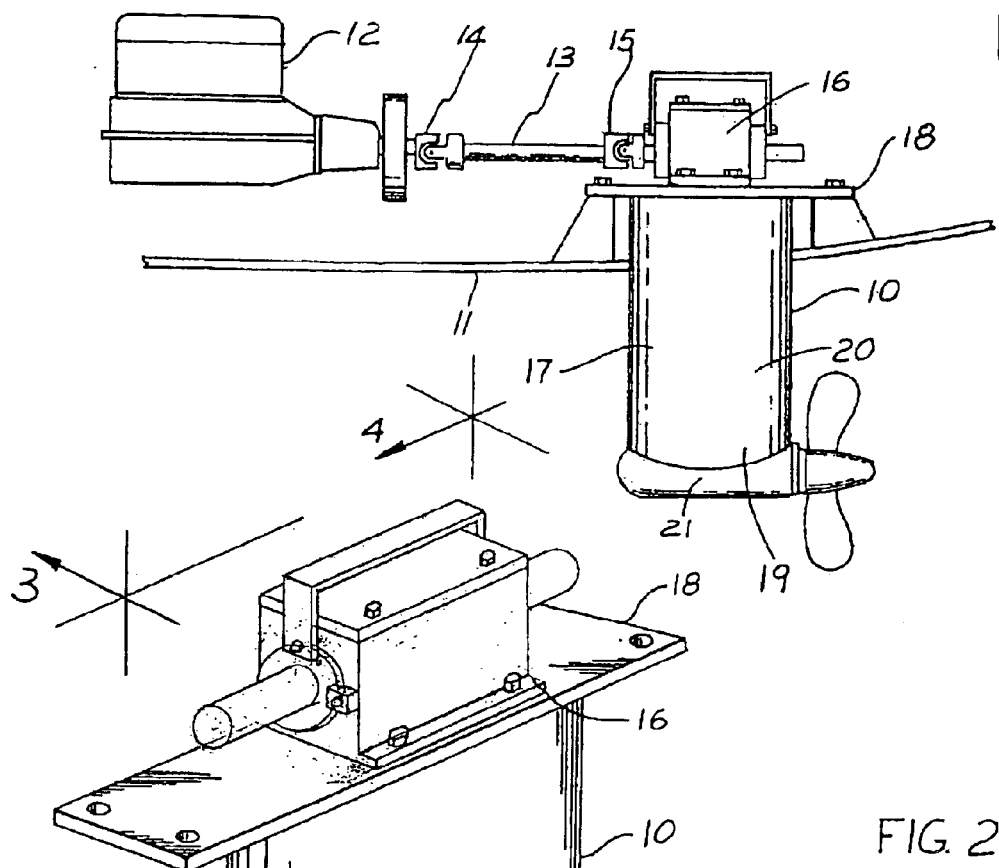
FIG. 1 is a schematic illustration of the subject drive installed in a boat.

The subject invention is a low frontal area, inboard, through-hull propeller drive. FIG. 1 illustrates schematically drive 10 mounted in boat 11 and powered by engine 12. The engine is connected to the drive by shaft 13 with universal joints 14 and 15 at each of its ends. This arrangement allows for angular and linear misalignment of the engine and drive. The drive comprises an upper apparatus 16 and a lower apparatus 17. The lower apparatus comprises a mounting plate 18 and a lower casing 19.

Casing 19 comprises, in one piece, strut 20 and propeller shaft pod 21.

Figure 2:
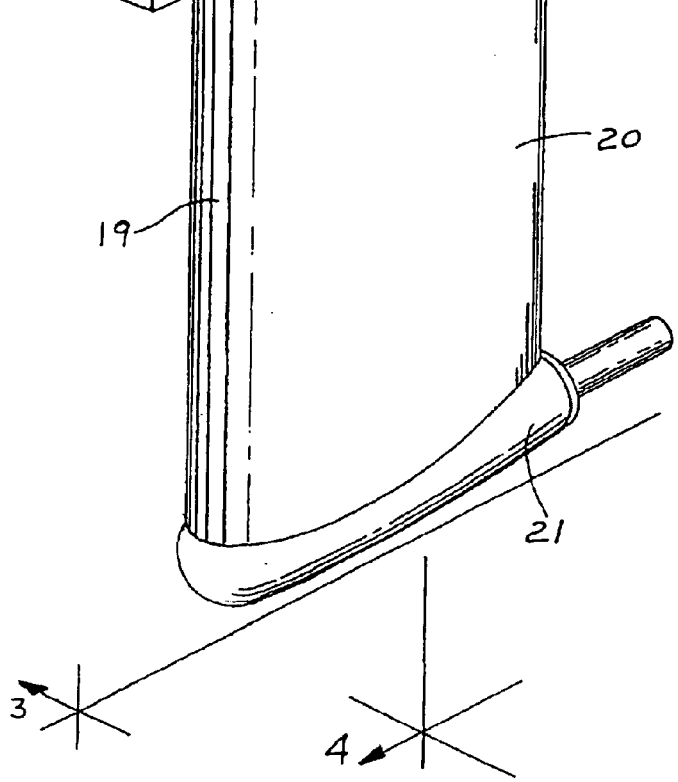
FIG. 2 is a general view of the subject drive.

FIG. 3 is a sectional view taken at 3—3 in FIG. 2 with parts numbered as in FIG. 2. Propeller shaft 22 is carried in bearings 23, 24 and 25 and carries drive sprocket 26 driven by chain 27. Bearing 23 fits in bore 28. Bearing 24 is carried in bore 29 in fitting 30. The sprocket is spaced from bearing 23 by flange 31 and from bearing 24 by spacer 32. Fitting 30 threads into pod 21 at 33 and carries bearing 25, held in place against shoulder 43 by snap ring 35. Seal 36 seals lubricant oil in the drive and seal 37 seals water out.

The upper apparatus 16 is symmetrical about its mid length plane perpendicular to the axis of the drive shaft 38 which carries drive sprocket 39 and chain 27. The shaft is supported by bearing 40 and 41. The bearings are carried in bearing carriers 42 and 43 which are rotationally installed in the centric bores 44 and 45 of upper apparatus casing 16'. The casing is attached to the top plate of the lower apparatus and chain 27 extends through opening 46 in the top plate. Seals 47 and 48 prevent oil leakage around the drive shaft and seals 49 and 50 prevent leakage between the casing ends and bearing carriers. Casing 16' has a cover 51. The bearing carriers are structurally interconnected by connector 52, fasteners, fastener 53 being typical, and index pins 54 and 55. With the bearing carriers adjustably attached as explained below, rotation of connector 52 will rotate bearing carriers and move bearings, drive shaft and sprocket outward and upward, adjusting tension in the chain. Rotating connector 52 in the opposite direction will relieve tension in the chain.

FIG. 4 is a sectional view taken at 4—4 in FIG. 2 and has parts numbered as in FIG. 3

Figure 5:
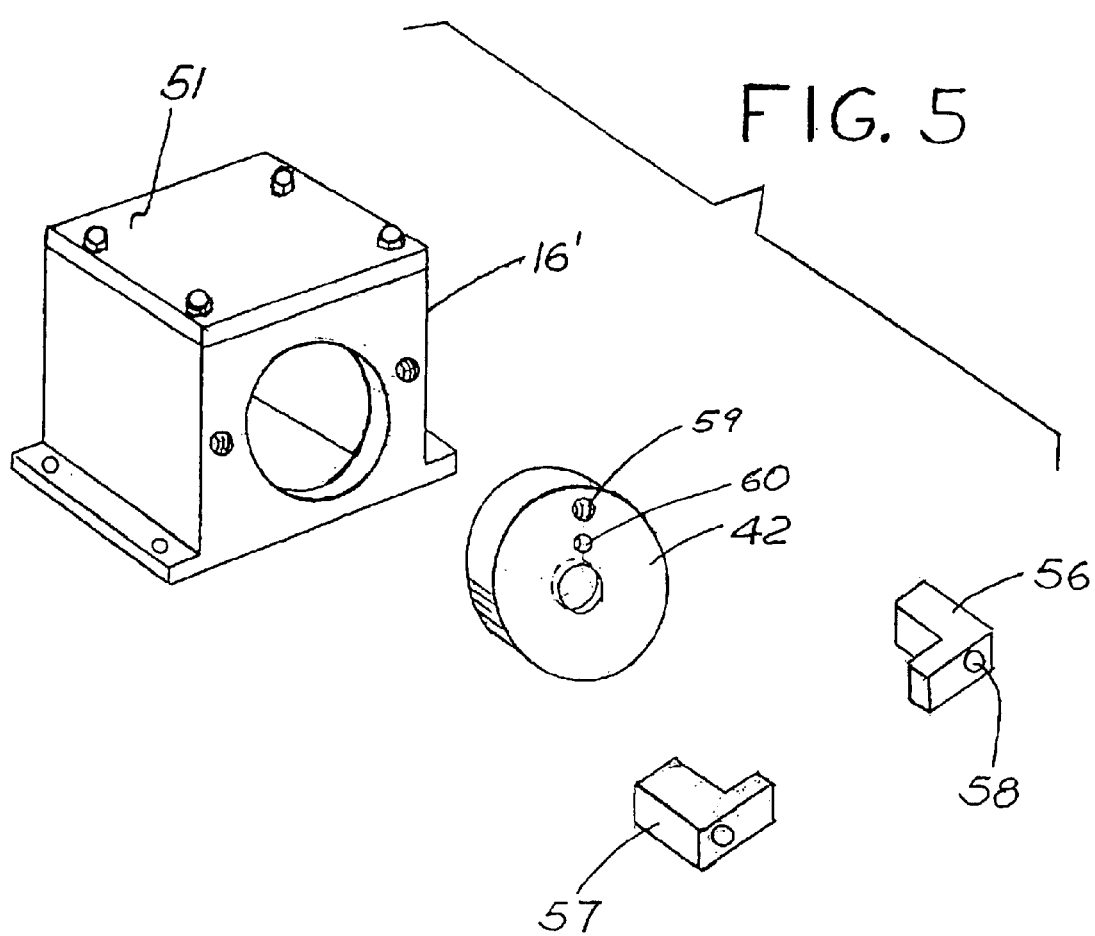
FIG. 5 is an exploded view showing details of the upper apparatus including, a bearing carrier and retaining clamps.

FIG. 5 is an exploded view showing details of upper apparatus casing and a bearing carrier numbered as in FIG. 3 plus clamps 56 and 57. The bearing carrier and a bearing installed in it are attached by screw fasteners (not shown in this view) which extend through the holes, hole 58 being typical, in the clamp and engaging the threaded holes in the casing. Threaded hole 59 and index hole 60 accept the threaded fastener (Shown in FIG. 2) and index pin 54 which attach the connector which interconnects the bearing carriers (described above).

Figure 6:
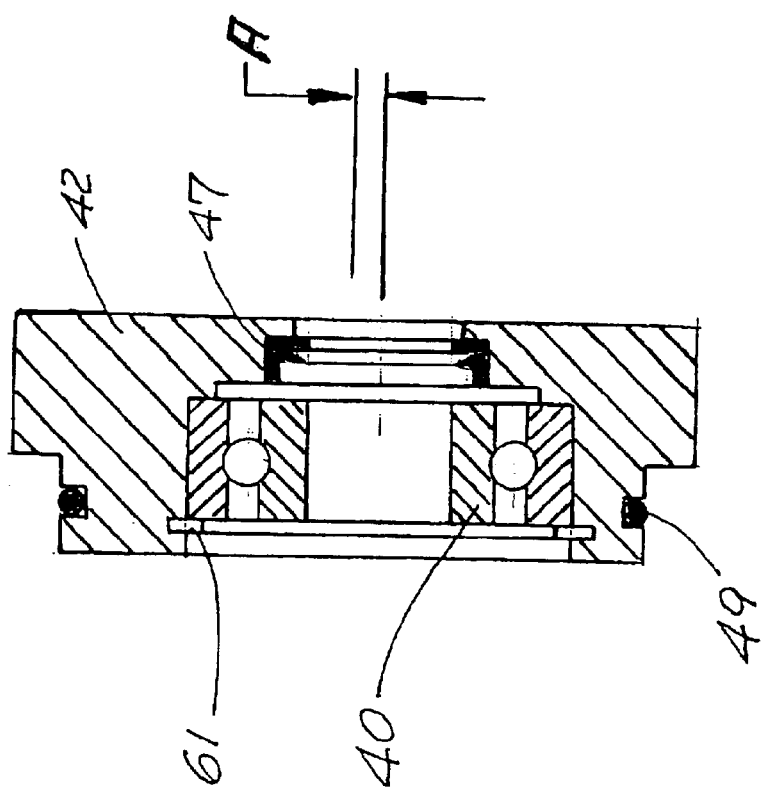
FIG. 6 is a sectional view of the eccentric bearing carrier.

FIG. 6 is a sectional view of the eccentric bearing carrier, both carriers being identical. Parts are numbered as in FIG. 3. Bearing 40 is retained in bearing carrier 42 by retaining ring 61. Distance A is the offset or eccentricity needed for adjustment of the chain tension.

Figure 7:
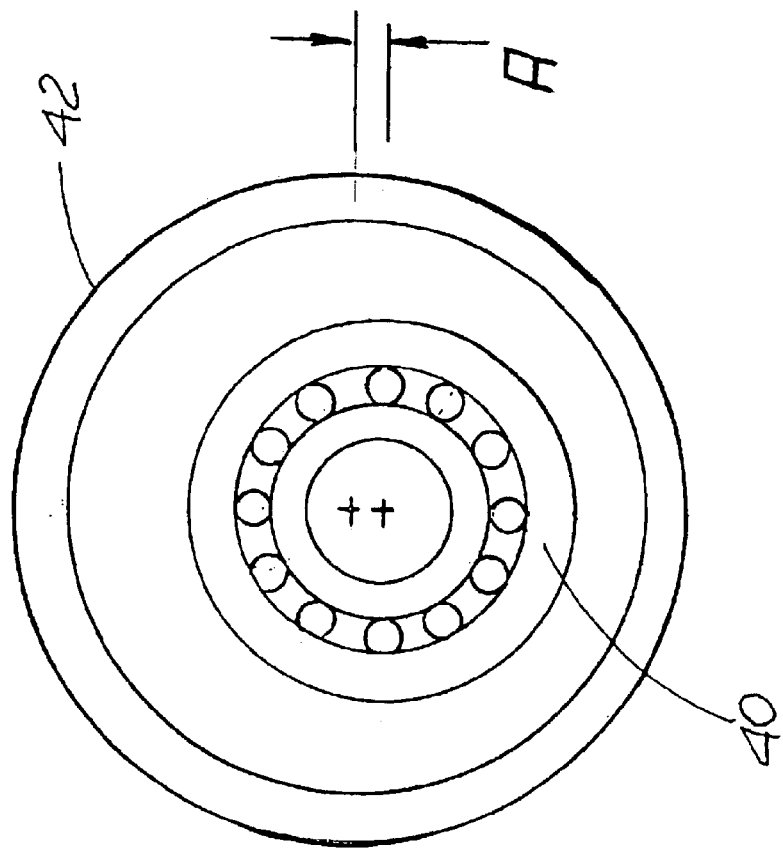
FIG. 7 is an end view of the eccentric bearing carrier.

FIG. 7 is an end view of the eccentric bearing carrier. Parts are numbered as in the other FIGS.

Figure 8:
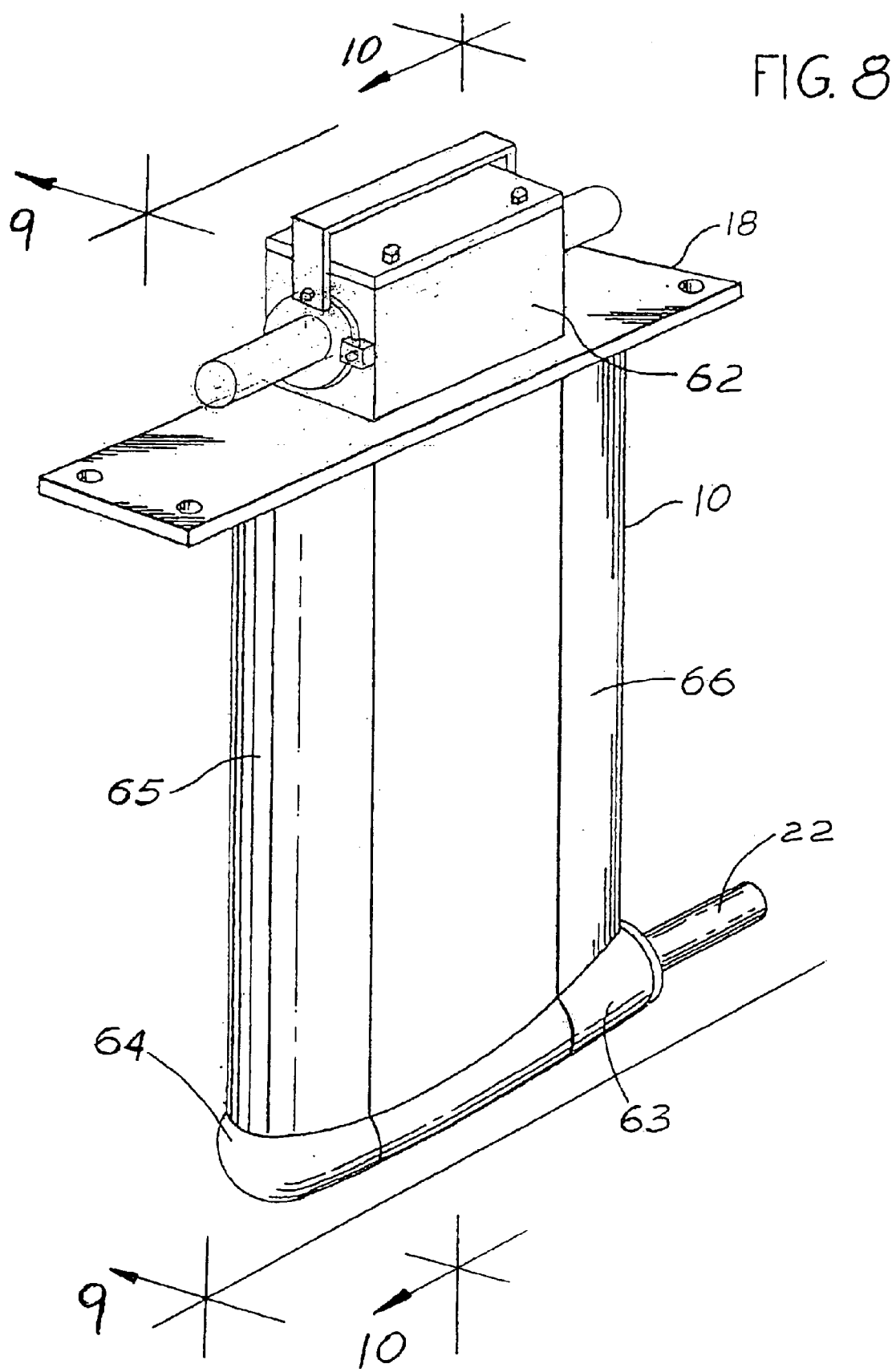
FIG. 8 is a general view like FIG. 2, showing a second embodiment of the subject drive.

FIG. 8 illustrates a second embodiment of the drive 10 utilizing a one piece casing 62 mounted to mounting plate 18. Propeller shaft 22 is mounted in rear pod 63 and nose pod 64. To achieve a high fineness ratio streamlined cross section shaped strut the casing is faired with fairing pieces 65 and 66. The pieces can be metal forming, shaped wood or shaped high density rigid foam. The shaped wood or shaped high density rigid foam is then bonded with layers of fiberglass to the casing. This method is very well known in the boat building industry.

FIG. 9 is a sectional view taken at 9—9 in FIG. 8. Propeller shaft 22 is carried in bearings 23, 24 and 25 and carries drive sprocket 26 driven by chain 27. Bearing 23 is mounted in nose pod 64. Nose pod 64 threads into casing 62 at 67. Bearing 24 is carried in bore 29 in fitting 30. The sprocket is spaced from bearing 23 by flange 31 and from bearing 24 by spacer 32. Fitting 30 threads into rear pod 63 at 33 and carries bearing 25, held in place against shoulder 34 by snap ring 35. Rear pod 63 threads into casing 62 at 68. Seal 36 seals lubricant oil in the drive and seal 37 seals water out. The casing 62 is symmetrical about its mid length plane perpendicular to the axis of drive shaft 38 which carries drive sprocket 39 and chain 27. The shaft is supported by bearing 40 and 41. The bearings are carried in bearing carriers 42 and 43 which are rotatably installed in bores 44 and 45 in casing 62. The casing 62 is attached to mounting plate 18 by welding or bolts (not shown). Seals 47 and 48 prevent oil leakage around the drive shaft and seals 49 and 50 prevent leakage between the centric bores at the casing ends and the bearing carriers. Casing 62 has a cover 51. The bearing carriers are structurally interconnected by connector 52, fasteners, fasteners 53 being typical, and index pins 54 and 55. Adjustment of the chain tension was described above. Fairing pieces 65 and 66 are located between mounting plate 18 and nose pod 64 and rear pod 63 and are secured to casing 62 as described above.

FIG. 10 is a sectional view taken at 10—10 in FIG. 8 and parts are numbered as in the other FIGS.

The embodiments which are illustrated and described are presented to serve as examples of the invention. They also constitute best modes of the invention known to me at this time. However, my scope of protection is not to be limited by the details of these embodiments, but rather is to be determined by the claims which follow, interpreted in accordance with established rules of patent claim interpretation, including use of the doctrine of equivalents.

I claim:

1. A through-hull inboard propeller drive comprising:

A casing having an upper end and a lower end, upper end apparatus and lower end apparatus, said upper end apparatus being assembled on said upper end, said lower end apparatus being assembled on said lower end, said drive further comprising a silent chain said upper end apparatus comprising:

a drive shaft a drive sprocket a first and second bearing first and second bearing carriers first and second ends of said upper apparatus, each having a centric bore said silent chain located between said first and second bearing carriers, said drive sprocket being mounted on said drive shaft, said drive shaft and drive sprocket being carried at said upper end, in said first and second bearing said lower end apparatus comprising:

a driven shaft third and fourth bearing a driven sprocket said driven sprocket being mounted on said driven shaft, said driven shaft and driven sprocket being carried in said lower apparatus, on said third and fourth bearing, said silent chain interconnecting said drive and driven sprockets, said drive and driven shafts and sprockets being a distance apart and parallel, said upper end apparatus further comprising a device for adjustment of said distance, said drive shaft being constrained by said bearing carriers mounted in said centric bores to remain parallel during said adjustment of said distance and being parallel when said adjustment is complete.

2. The propeller drive of claim 1 in which said first and second bearings are carried eccentrically in said first and second bearing carriers and further comprising a connector for interconnecting said first and second bearing carriers, said first bearing carrier being rotatably installed in said first centric bore, said second bearing carrier being rotatably installed in said second centric bore, said connector interconnecting said first bearing carrier with said second bearing carrier such that said first and second bearing carriers are aligned, so that the movement of the connector causes equal movement of said bearing carriers, said bearings, said drive shaft and said silent chain, said drive shaft remaining parallel to said driven shaft during said adjustment and after said adjustment.

3. The propeller drive of claim 1 further comprising means to selectively prevent movement of said connector and said bearing carriers relative to said casing.

4. The propeller drive of claim 1 in which said first centric bore in said front plate and said second centric bore in said rear plate are centrally located about the same horizontal center axis.

5. The propeller drive of claim 1 in which said first centric bore in said front plate and said second centric bore in said rear plate are centrally located about the same vertical center axis but a distance apart.

6. The propeller drive of claim 2 in which said first centric bore in said front plate and said second centric bore in said rear plate are centrally located about the same horizontal center axis.

7. The propeller drive of claim 2 in which said first centric bore in said front plate and said second centric bore in said rear plate are centrally located about the same vertical center axis but a distance apart.

\* \* \* \* \*